United States Patent Office 2,973,258
Patented Feb. 28, 1961

2,973,258
UNSYMMETRICAL ALPHA-HALOACETAMIDE HERBICIDES

Philip C. Hamm, Webster Groves, and Angelo J. Speziale, Kirkwood, Mo., assignors to Monsanto Chemical Company, St. Louis, Mo., a corporation of Delaware No Drawing. Filed Dec. 30, 1957, Ser. No. 705,805

12 Claims. (Cl. 71—2.7)

This invention relates to herbicidal compounds and methods for their use. More particularly, this invention relates to methods of inhibiting the growth of grasses in the presence of other vegetation.

Many chemical compounds are known to be deleterious to the growth of vegetation and to have herbicidal effects under specific conditions, some of which are known to be quite effective at low levels of application. It is, however, a more difficult problem to provide useful herbicides for selective activity on undesirable plants, but which are otherwise harmless to other vegetation. Compounds of this type are known, being primarily useful in eliminating broad leaf plants from grasses or grass-like cereal crops. This herbicidal activity is frequently related to the leaf area exposed to the herbicide, the plants with larger leaf areas being more susceptible to the contact herbicides.

In copending cases there are described herbicidal and particularly pre-emergence herbicidal uses of alpha-chloroacetamides having short alkyl substituents on the amide nitrogen. However, if an alkyl substituent is longer than six carbon atoms, the alpha-chloroacetamide does not have herbicidal properties.

The primary purpose of this invention is to provide a new and useful class of herbicidal compounds. A further purpose is to destroy plants and particularly grasses. A still further purpose is to provide a new class of compounds capable of selective destruction of grass growing in broad leaf crops.

In accordance with this invention, it has now been discovered that alpha-chloro-acetamides having a single large alkyl substituent of 7 to 14 carbon atoms will have unusual activity if the other substituent is a short chain aliphatic substituent of one to four carbon atoms.

The new herbicidal compounds are those having the structure:

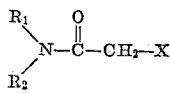

wherein X is a halogen atom, $R_1$ is an alkyl radical having 7 to 14 carbon atoms; $R_2$ is an aliphatic radical of the group consisting of alkyl radicals having one to four carbon atoms, alkenyl radicals having one to four carbon atoms, alkynyl radicals having one to four carbon atoms and the corresponding halogen substituted radicals.

Suitable new compounds for practicing the inventive herbicidal method are:

Alpha-chloro-N-n-octyl-N-allyl-acetamide.
Alpha-bromo-N-tetradecyl-N-ethyl-acetamide.
Alpha-chloro-N-decyl-N-3-chlorobutyl-acetamide.
Alpha-iodo-N-ethylhexyl-N-methyl-acetamide.
Alpha-chloro-N-dodecyl-N-propargyl-acetamide.

The new compounds are prepared by reacting the appropriate mixed di-amines with a haloacetylchloride in a suitable organic solvent in the presence of an alkali metal hydroxide. Suitable diamines are those having one alkyl radical of 7 to 14 carbon atoms and the other substituent being an aliphatic radical having from one to four carbon atoms. Suitable haloacetyl chlorides are the chloroacetyl chlorides and bromoacetyl chlorides. The corresponding iodo compounds are preferably prepared by the digestion of the alpha-chloro-acetamide with potassium iodido solution.

Further details of the preparation are set forth with respect to the following specific examples:

Example 1

An autoclave is charged with one mole equivalent of decyl bromide, 2½ mole equivalents of ethyl amine and methyl alcohol for the reaction medium. The autoclave was heated at 110° C. at 75 pounds per square inch for six hours. After the autoclave was cooled and vented, the contents were poured into a suitable container and neutralized with an excess of caustic. The reaction mixture was extracted with ether, dried over magnesium sulphate, and distilled, B.P. 147 at 0.65 mm., $n_d^{25}$ 1.4390.

The N-ethyl decyl amine as prepared above was reacted with chloro acetyl chloride in the presence of sodium hydroxide. The compound recovered was identified as alpha-chloro-N-ethyl-N-decyl-acetamide, B.P. 134° C. at 0.16 mm., $n_d^{25}$ 1.4662.

Example 2

Using the procedure of Example 1 except substituting N-methylhexyl propyl amine for the decyl ethyl amine the compound alpha-chloro-N-propyl-N-2-methylhexyl-acetamide is synthesized.

Example 3

Three additional preparations by analogous procedures are made for purposes of demonstrating the unusual herbicidal properties of the claimed compounds over near homologues.

Alpha-chloro-N-dodecyl-acetamide.
Alpha-chloro-N-N-di-(2-ethylhexyl)-acetamide.
Alpha-chloro-N-tetradecyl-acetamide.

Relative value of the claimed compounds was determined by planting greenhouse flats with seeds of numerous different plants each representing a principal botanical type. Plants were treated with the various compounds at rates equivalent to 25 pounds per acre. In the following table of the herbicidal evaluation data, these plants are represented by letters as follows:

A—Wild oat
B—Brome
C—Rye
D—Buckwheat
E—Radish
F—Cotton
G—Cucumber
H—Corn

The relative value of each compound with respect to its herbicidal effect on the various plants is indicated by a number as follows:

0—No phytotoxicity
1—Slight phytotoxicity
2—Moderate phytotoxicity
3—Severe phytotoxicity

| Compound | Rate | A | B | C | D | E | F | G | H |
|---|---|---|---|---|---|---|---|---|---|
| α-chloro-N-dodecyl-acetamide | 25 | 0 | 0 | 0 | 0 | 0 | 0 | 0 | 0 |
| α-chloro-N,N- di- (2-ethylhexyl)- acetamide | | 1 | 2 | 0 | 0 | 0 | 1 | 1 | |
| α-chloro-N-tetra-decyl-acetamide | | 1 | 1 | 1 | 0 | 0 | 0 | 0 | |
| α-chloro-N-ethyl-N - decyl - acetamide | | 3 | 3 | 3 | 1 | 0 | 0 | | 0 |

The above data demonstrates that the claimed compounds have a much greater herbicidal activity than do various homologous compounds at the 25 pound per acre level of application. The selective activity is observed over a wide range of application levels and to demonstrate this, experiments were conducted at the practicable level of 5 pounds per acre on a large number of plant types. On six diffierent gasses, the alpha-chloro-N-ethyl-N-n-dodecyl-acetamide had an average rating of 2.17 while on six broad leaf plants representing genera of crop plants, the average herbicidal rating was 0.17.

Valuable herbicidal effects, especially with respect to grasses, will be observed from applications of small amounts, often as low as 0.5 pound per acre as well as at higher concentrations, for example 100 pounds per acre. The selective activity on grasses is more pronounced at lower levels of application, for example from one to 15 pounds per acre. At heavier levels of application, for example 10 to 50 pounds per acre, the selectivity is less pronounced and the general herbicidal effects are obtained.

To obtain the general herbicidal effects, application may be made by spraying the foliage of a growing plant. The selective activity is observed by pre-emergence application by spraying the compound or formulations thereof on the soil surface either prior to or subsequent to the planting of the seed. The preferred method is to plant the seed first and spray the surface with a formulation of the compound which will permeate the top soil layer and destroy the grasses by contact either prior to or subsequent to germination.

These herbicides are not usually applied in neat form, more efficient use being obtained by the use of formulations which include in addition to the alpha-chloro-acetamides various conditioning agents which enhance the activity or adapt it for use with conventional machinery for treating plant or soil surfaces.

The solid formulations, frequently referred to a "dusts" may contain in addition to the active ingredient, diluents or extenders, dispersing agents to prevent local high concentrations, and agents to facilitate distribution in soil or soil waters. Suitable solid diluents are those which render the compositions permanently dry and free flowing. Thus hygroscopic materials are to be avoided unless the compositions also contain a separate substance to serve as an aid to the flowability. Effective solid diluents, preferably pulverulent or granular in form so as to be effective carriers for the active ingredient, are the natural clays, such as china clays, the bentonites and the attapulgites; other minerals in natural state, such as talc, pyrophyllite, quartz, diatomaceous earth, fuller's earth, chalk, rock phosphate and sulfur; and the chemically modified minerals, such as the acid washed bentonite, precipitated calcium phosphate, precipitated calcium carbonate and colloidal silica. These diluents may represent a substantial portion, for example 50 to 98 percent by weight, of the entire formulation as applied to plant or soil. More concentrated herbicides will require dilution by the user in order to properly condition the soil for the most effective usage. The concentrated solid herbicidal formulations can be used with less danger if it is mixed with the surface soil by means of a diskplow or harrow at the time of application.

The liquid compositions for herbicidal use may be solutions, or other liquid dispersions. The choice of a liquid medium will depend to some extent upon the physical properties of the active ingredient. The N-substituted alpha-haloacetamides may be water-soluble and mere dissolution will then provide a usable formulation. Often the N-substituted alpha-haloacetamides are only limitedly soluble in water and therefore aqueous formulations will necessarily be dispersions of minute drops of the water-insoluble substances in suspension in an aqueous medium. The known water-insoluble substituted alpha-haloacetamides of this invention may first be dissolved in a suitable organic solvent and the organic solution of the active ingredient then incorporated in water or in any aqueous medium to produce a heterogeneous dispersion of the active ingredient in water.

One composition which aids in the effectivity of the herbicidal component is a surface active agent which serves in providing uniform dispersions of all formulation components of both solid and liquid types, and may be anionic, cationic or non-ionic types and includes conventional soaps, such as the water-soluble salts of long chain carboxylic acids, the amino soaps such as the amine salts of long chain carboxylic acids, the sulfonated animal, vegetable and mineral oils, quaternary salts of high molecular weight acids, rosin soaps such as salts of abietic acid, sulfuric acid salts of high molecular weight organic compounds, algin soaps, ethylene oxide condensated with fatty acids, alkyl phenols and mercaptans, and other simple and polymeric compositions having both hydrophilic and hydrophobic functions so as to enable the mixing of otherwise immiscible ingredients. Generally, the surface active agents will be only a minor portion of the formulation as used, for example less than 10 percent and frequently as low as 0.05 percent. In general, concentrations of from 0.5 to 5 percent are found to be optimum.

Many of the formulations are benefited by the incorporation of organic solvents for the active components, such as the water-immiscible organic alcohols, ketones and hydrocarbons, for example isopropanol, benzene, acetone, methylethyl ketone, kerosene, and chlorinated hydrocarbons. The proportions of such organic liquid additives will depend upon the solubility properties of the active ingredient and may require as little as 1 percent or as much as 20 percent in order to provide a uniformly distributed formulation which is capable of maintaining its distributed state during storage, use and after application to the soil or plant surfaces.

A useful formulation of the herbicidal compositions may involve the solid or liquid concentrate of the active ingredient to which has been added formulation aids or conditioning agents so that the concentrates may be mixed with a suitable extender or diluent in the field at the time of use. Obviously, for this purpose the dispersing agents will be present in larger concentrations so that upon dilution with water or a solid extender, compositions, containing optimum proportions of dispersing agents and active component, will be prepared. The solid or liquid formulations are preferably applied by mechanical equipment involving spraying or spreading the formulation on soil or plant surfaces being treated. For this purpose readily flowable compositions are required, either liquid or solid in physical state. Thus a critical aspect of the invention is the fluent carrier without which the optimum herbicidal effects cannot be achieved.

Both the solid and the liquid formulations above described are useful in the application of herbicides because they facilitate the uniform distribution and aid in the destruction of undesirable plants by maintaining the active ingredient in a form which enables the prompt assimilation by the plant and the efficient utilization of its weed destroying properties. The described conditioning agents enable the proper use to achieve the desired herbicidal effects by an unskilled operator without elaborate equipment.

In addition to the above described herbicide conditioning agents other adjuvants may be added, such as insecticides, fungicides, nematocides and other herbicides. By the use of the subject compounds at the low grass specific levels of application, substantial benefits can be obtained by the addition thereto of a broad leaf specific herbicide. In this manner, formulations of efficient and effective use can be provided.

What is claimed is:

1. The method of inhibiting the germination of grass seeds in contact with soil and the preemergence growth thereof, which comprises treating the said soil with a herbicidal amount of the compound of the structure:

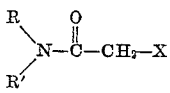

wherein R is an alkyl radical having seven (7) to fourteen (14) carbon atoms, R' is an aliphatic radical having from one (1) to four (4) carbon atoms selected from the group consisting of alkyl, alkenyl, alkynyl and the corresponding halogen substituted radicals, and wherein X is a halogen atom selected from the group consisting of chlorine, bromine and iodine.

2. The method of selectively inhibiting the germination and growth of grass from seeds in contact with the soil which comprises treating the soil with a herbicidal amount consisting of one to 15 pounds per acre of a compound having the structure:

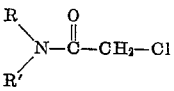

wherein R is an alkyl radical having from 7 to 14 carbon atoms and R' is an alkyl radical having from one to four carbon atoms.

3. The method defined by claim 1 wherein the herbicidal compound is alpha-chloro-N-decyl-N-ethyl-acetamide.

4. The method defined by claim 1 wherein the herbicidal compound is alpha-chloro-N-dodecyl-N-propyl-acetamide.

5. The method defined by claim 1 wherein the herbicidal compound is alpha-chloro-N-allyl-N-octyl-acetamide.

6. The method defined by claim 1 wherein the herbicidal compound is alpha-chloro-N-2-methylhexyl-N-propyl-acetamide.

7. The method defined by claim 1 wherein the herbicidal compound is alpha-chloro-N-dodecyl-N-propargyl-acetamide.

8. The method defined by claim 2, wherein the herbicidal compound is alpha-chloro-N-decyl-N-ethyl-acetamide.

9. The method defined by claim 2, wherein the herbicidal compound is alpha-chloro-N-dodecyl-N-propyl-acetamide.

10. The method defined by claim 2, wherein the herbicidal compound is alpha-chloro-N-allyl-N-octyl-acetamide.

11. The method defined by claim 2, wherein the herbicidal compound is alpha-chloro-N-2-methylhexyl-N-propyl-acetamide.

12. The method defined by claim 2, wherein the herbicidal compound is alpha-chloro-N-dodecyl-N-propargyl-acetamide.

References Cited in the file of this patent

UNITED STATES PATENTS

| | | |
|---|---|---|
| 2,256,186 | Balle et al. | Sept. 16, 1941 |
| 2,516,674 | Bruce et al. | July 25, 1950 |
| 2,580,922 | Jacoby | Jan. 1, 1952 |
| 2,636,816 | Stewart et al. | Apr. 28, 1953 |
| 2,705,244 | Goldberg et al. | Mar. 29, 1955 |
| 2,746,901 | Bruce et al. | May 22, 1956 |
| 2,864,683 | Hamm et al. | Dec. 6, 1958 |

OTHER REFERENCES

Leonard et al.: "Chemical Abstracts," 1949, vol. 43, col. 5081(g) to 5082(a).

Frear: Catalogue of "Insecticides and Fungicides," vol. II, 1948, page 25.

Hamm et al.: J. of Agric. and Food Chemistry, vol. 4, No. 6, June 1956, pages 518 to 522.